United States Patent Office 3,641,140
Patented Feb. 8, 1972

---

3,641,140
PROCESS FOR THE PREPARATION OF CHLORO-ALKANE SULPHONYL CHLORIDES
Wolfgang Keberle, Leverkusen, Germany, assignor to Farbenfabriken Bayer Aktiengesellschaft, Leverkusen, Germany
No Drawing. Filed Oct. 14, 1968, Ser. No. 767,513
Claims priority, application Germany, Nov. 9, 1967, F 53,993
Int. Cl. C07c *143/70*
U.S. Cl. 260—543 R       2 Claims

ABSTRACT OF THE DISCLOSURE

Chloroalkane sulphonyl chlorides are prepared by reacting a cyclicthioether also known as a sultone, with the chloride of an inorganic acid at a temperature from about 40 to about 150° C. in the presence of an acid amide.

---

Various processes have already been described for the preparation of chloroalkanesulphonyl chlorides. They are obtained, for example together with other isomeric chloroalkane sulphonyl chlorides, by sulphochlorination of chloroalkanes under the conditions of Reed reactions.

Chloroalkanesulphonyl chlorides can also be prepared by oxidation and chlorination of cyclic thioethers and hydroxyl-substituted or chloro-substituted mercaptans with chlorine in the presence of water. Isomeric compounds are formed in this process as a result of chlorination with elemental chlorine. Extensive separation and purification operations thereby become necessary, and in addition the yield is reduced by side reactions.

Attempts have also been made to chlorinate hydroxyalkane sulphonates with phosphorus pentachloride. The yields of chloroalkanesulphonyl chlorides obtained by this process are not more than 70%.

It has now been found that chloroalkanesulphonyl chlorides are obtained in good yields and free from impurities by reacting a sultone of the formula

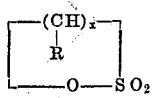

in which $x$ is 3 or 4 and
R is a hydrogen atom and/or a lower alkyl radical, with at least the stoichiometrically required quantity of the chloride of an inorganic acid, in the presence of an acid amide of the formula

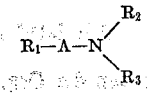

in which

A represents the group

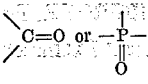

$R_1$ represents the radical

$R_1$ representing two such radicals when A represents the group

either or both $R_2$ and $R_3$ represent lower alkyl groups, or one of the radicals $R_2$ or $R_3$ represents a hydrogen atom, and the other represents a lower alkyl group; $R_2$ and $R_3$ may also form a 5- to 7-membered heterocyclic ring together with the nitrogen atom which links them, which ring may contain a further nitrogen atom or an oxygen atom as an additional hetero atom, and, furthermore, $R_1$ may represent a hydrogen atom, an alkyl radical having 1 to 12 carbon atoms (preferably 1 to 4 carbon atoms) optionally in the presence of inert organic solvent, at about 40 to about 150° C.

The chlorides of inorganic acids may be ony of the known, conventional chlorinating agents such as phosphorus trichloride, sulphuryl chloride, $SCl_2$, $S_2Cl_2$ and phosgene; thionyl chloride and phosphorus pentachloride are preferably used.

The reaction may be carried out in the absence of a solvent or in the presence of a solvent. The solvents should not react with the sultone or the acid chloride used for chlorination or the reaction product, and include hydrocarbons such as benzene, toluene, xylene and petroleum ether; halogenated hydrocarbons such as methylene dichloride, chloroform and carbon tetrachloride; ketones such as methyl ethyl ketone; ethers such as tetrahydrofuran and dioxane, and esters such as ethyl acetate.

The reactants are generally used in the reaction in stoichiometric quantities. An excess of acid chloride is preferably used. The reactants may be added in any sequence.

N-alkyl-substituted acid amides which are especially suitable for use in the process according to the invention are, for example, acid amides which are mono-substituted or disubstituted by methyl, ethyl, butyl or propyl groups, such as methylformamide, dimethylformamide, dimethyl acetamide, tetramethyl urea and hexamethyl phosphoric acid triamide. The N-alkyl-substituted acid amides are generally used in quantities of 0.5 to 10% by weight, preferably 1 to 5% by weight, based on the sultone used. In some cases the above-mentioned acid amides given by way of example, may be used as solvents. Dimethyl formamide and methylformamide are particularly suitable in this respect.

The reaction is generally carried out at between about 40 and about 150° C., preferably between about 60 and about 120° C.

After the reaction is completed, the unreacted components are removed in the usual manner, e.g. by distillation or by filtration or decanting. Particularly pure chloroalkane sulphonyl chloride is obtained by vacuum distillation.

The chloroalkanesulphonyl chlorides obtainable by the process according to the invention are suitable for use in the preparation of esters, amides and sultams and may be used in the synthesis of intermediate products, plant protective agents and pesticides.

EXAMPLE 1

122 g. of 1,3-propanesultone are added with rapid stirring to a mixture of 130 g. of thionyl chloride which has been freshly distilled over linseed oil and 5 ml. of dimethylformamide. Evolution of gas starts when the reaction mixture is heated to about 70° C. After 3 hours at 70° C., excess thionyl chloride is removed by evacuation, using a water jet pump, and the reaction product 3-chloropropane-sulphonyl chloride, $Cl—CH_2CH_2CH_2—SO_2Cl$, is fractionally distilled under a high vacuum.

Boiling point: 73–75° C. at 0.15 mm. Hg, $n_{20}^D$:1.4891
Yield: 166.5 g. (=94% of the theoretical)

Calculated (percent): C, 20.3; H, 3.5; Cl, 40.2; O, 18.2; S, 18.2. Mol./wt., 177. Found (percent): C, 20.7; H, 3.6; Cl, 39.4; O, 18.2; S, 18.2. Mol./wt. 176. (Cryoscopically in dioxane).

165 g. of 3-chloropropane-sulphonyl chloride, which is a liquid of high refractive index and which has an extremely unpleasant leek-like smell, is obtained in a similar manner, using 200 ml. of carbon tetrachloride as solvent.

EXAMPLE 2

5 ml. of methylformamide are added to a mixture of 130 g. of thionyl chloride and 122 g. of 1,3-propane-sultone at room temperature, and the reaction mixture is heated to about 60 to 80° C. with stirring. Evolution of gas ceases after 3 hours. Excess thionyl chloride is removed from the reaction mixture which is distilled under a high vacuum. Boiling point: 70 to 73° C. at 0.1 mm.; yield: 158 g. (=98% of the theoretical)

Cl—CH$_2$CH$_2$CH$_2$—SO$_2$Cl

EXAMPLE 3

The procedure is the same as in Examples 1 and 2, except that 5 ml. of dimethylacetamide are used instead of dimethylformamide and methyl formamide. Yield: 122 g. (=69% of theoretical) Cl—CH$_2$CH$_2$CH$_2$—SO$_2$Cl.

EXAMPLE 4

122 g. of 1,3-propanesultone are melted and 220 g. of phosphorus pentachloride are added thereto. 5 ml. of dimethylformamide are then added to the suspension so obtained. The phosphorus pentachloride dissolves slowly on heating. After 3 hours at about 120° C., the phosphorus oxychloride formed is distilled off under normal pressure and the 3-chloropropane sulphonyl chloride formed is fractionated under a high vacuum. Boiling point: 69–70° C. at 0.1 mm. Hg; yield: 151 g. (=85% of theoretical) Cl—CH$_2$CH$_2$CH$_2$—SO$_2$Cl.

EXAMPLE 5

The same procedure is employed as in Example 1 except that 5 ml. of hexamethylphosphoric acid triamide are used instead of methyl formamide. Yield: 148 g. (=82.6% of the theoretical) Cl—CH$_2$CH$_2$CH$_2$—SO$_2$Cl.

EXAMPLE 6

The same procedure is employed as in Example 2 except that 5 ml. of tetramethylurea are used instead of dimethylformamide. Yield: 151 g. (=85% of theoretical)

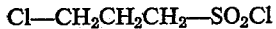

Cl—CH$_2$CH$_2$CH$_2$—SO$_2$Cl

EXAMPLE 7

136 g. of 1,4-butanesultone are added with rapid stirring to a mixture of 130 g. of thionyl chloride and 5 ml. of dimethyl formamide. The reaction mixture is heated to 70° C. and kept at 70 to 80° C. for 3 hours. Unreacted thionyl chloride is then distilled off under normal pressure and the residue is fractionally distilled over a column under a high vacuum.

Boiling point: 110–112° C. at 1 mm. Hg;
Yield: 58 g. of 4-chlorobutane-sulphonic acid chloride:

Calculated (percent): C, 25.1; H, 4.2; Cl, 37.2; O, 16.75; S, 16.75. Found (percent): C, 25.7; H, 4.4; Cl, 36.4; O, 16.7; S, 16.8.

If the process is carried out in the presence of 200 ml. of dimethylformamide as solvent, 56 g. of 4-chlorobutanesulphonyl chloride of boiling point 110–112° C. and 1 mm. Hg are obtained in an analogous manner.

I claim:
1. Process for the preparation of chloroalkanesulphonyl chlorides, characterized in that a sultone of the formula

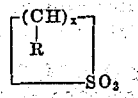

in which x is 3 or 4 and

R represents a hydrogen atom is reacted with at least the stoichiometrically required quantity of a chloride of an inorganic acid, in the presence of an acid amide of the formula

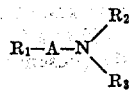

in which

A represents the group

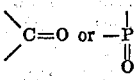

and, in cases where

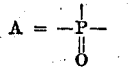

R$_1$ represents two radicals

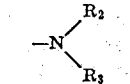

either both R$_2$ and R$_3$ represent lower alkyl groups, or one of the radicals R$_2$ and R$_3$ may represent a hydrogen atom, and the other represents a lower alkyl radical and R$_1$ represents in addition, a hydrogen atom, an alkyl radical having 1 to 12 carbon atoms, or the radical

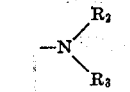

if desired in the presence of an inert organic solvent, at about 40 to about 150° C.

2. Process according to claim 1, characterised in that propanesultone is reacted with a chloride of an inorganic acid in the presence of N-alkylsubstituted acid amides.

References Cited

Chemical Reviews. Vol. 54 (August 1954), p. 62293. QD1A563.

Gilbert. Sulfonation and Related Reactions (1965), p. 284. QD305S3G5.

Houben-Weyl, Methoden der Org. Chim., Band IX, p. 390.

Kharasch, Org. Sulfur Cmpds., pp. 190–1 (vol. 1), QD412S1G7.

LORRAINE A. WEINBERGER, Primary Examiner

E. J. GLEIMAN, Assistant Examiner

UNITED STATES PATENT OFFICE
CERTIFICATE OF CORRECTION

Patent No. 3,641,140     Dated February 8, 1972

Inventor(s) Wolfgang Keberle

It is certified that error appears in the above-identified patent and that said Letters Patent are hereby corrected as shown below:

Col. 3, line 20, "98%" should read -- 89% --.

Signed and sealed this 13th day of June 1972.

(SEAL)
Attest:

EDWARD M. FLETCHER, JR.
Attesting Officer

ROBERT GOTTSCHALK
Commissioner of Patents